(12) United States Patent
Carles et al.

(10) Patent No.: US 11,518,285 B2
(45) Date of Patent: Dec. 6, 2022

(54) NECK SUPPORT MODULE FOR VEHICLE SEAT HEADREST

(71) Applicant: FAURECIA Sièges d'Automobile, Nanterre (FR)

(72) Inventors: Fabrice Carles, Luze (FR); Tomasz Stasinski, Dzierzoniów (PL); Robert Grzeslo, Swidnica (PL)

(73) Assignee: FAURECIA Sièges d'Automobile, Nanterre (FR)

( * ) Notice: Subject to any disclaimer, the term of this patent is extended or adjusted under 35 U.S.C. 154(b) by 0 days.

(21) Appl. No.: 16/732,377

(22) Filed: Jan. 2, 2020

(65) Prior Publication Data
US 2020/0215949 A1 Jul. 9, 2020

(30) Foreign Application Priority Data
Jan. 3, 2019 (FR) ..................... 19 00045

(51) Int. Cl.
*A47C 7/38* (2006.01)
*B60N 2/90* (2018.01)
*B60N 2/806* (2018.01)

(52) U.S. Cl.
CPC ............ *B60N 2/976* (2018.02); *B60N 2/806* (2018.02); *B60N 2205/30* (2013.01)

(58) Field of Classification Search
CPC ........ B60N 2/879; B60N 2/914; B60N 2/976; B60N 2/0244; B60N 2/0232; B60N 2/66; B60N 2/665; B60N 2/806
See application file for complete search history.

(56) References Cited

U.S. PATENT DOCUMENTS

| 4,758,047 | A | * | 7/1988 | Hennington | B60R 11/0217 297/397 |
| 4,779,930 | A | * | 10/1988 | Rosen | A47D 15/006 297/391 |
| 4,796,953 | A | * | 1/1989 | Pereira | B60N 2/847 297/400 |
| 5,330,255 | A | * | 7/1994 | Stawicki | A47C 7/383 297/391 |
| 5,974,607 | A | * | 11/1999 | Smith | A61G 7/072 297/393 |
| 6,158,812 | A | * | 12/2000 | Bonke | B60R 16/08 297/391 |
| 6,199,900 | B1 | * | 3/2001 | Zeigler | B60R 21/207 280/735 |
| 7,040,705 | B2 | * | 5/2006 | Clough | B60N 2/885 297/410 |

(Continued)

FOREIGN PATENT DOCUMENTS

CN 208149133 U 11/2018
DE 102005030258 A1 1/2007
(Continued)

OTHER PUBLICATIONS

French Preliminary Search Report for French App. No. FR1900045 dated Nov. 13, 2019, BET190428 FR, 14 pages, (No English translation avaialble).

*Primary Examiner* — Shin H Kim
(74) *Attorney, Agent, or Firm* — Barnes & Thornburg LLP

(57) ABSTRACT

A neck support module for a headrest device of a vehicle seat comprises a frame and at least one inflatable pouch fixed to the frame.

19 Claims, 7 Drawing Sheets

(56) References Cited

U.S. PATENT DOCUMENTS

Figure 1:
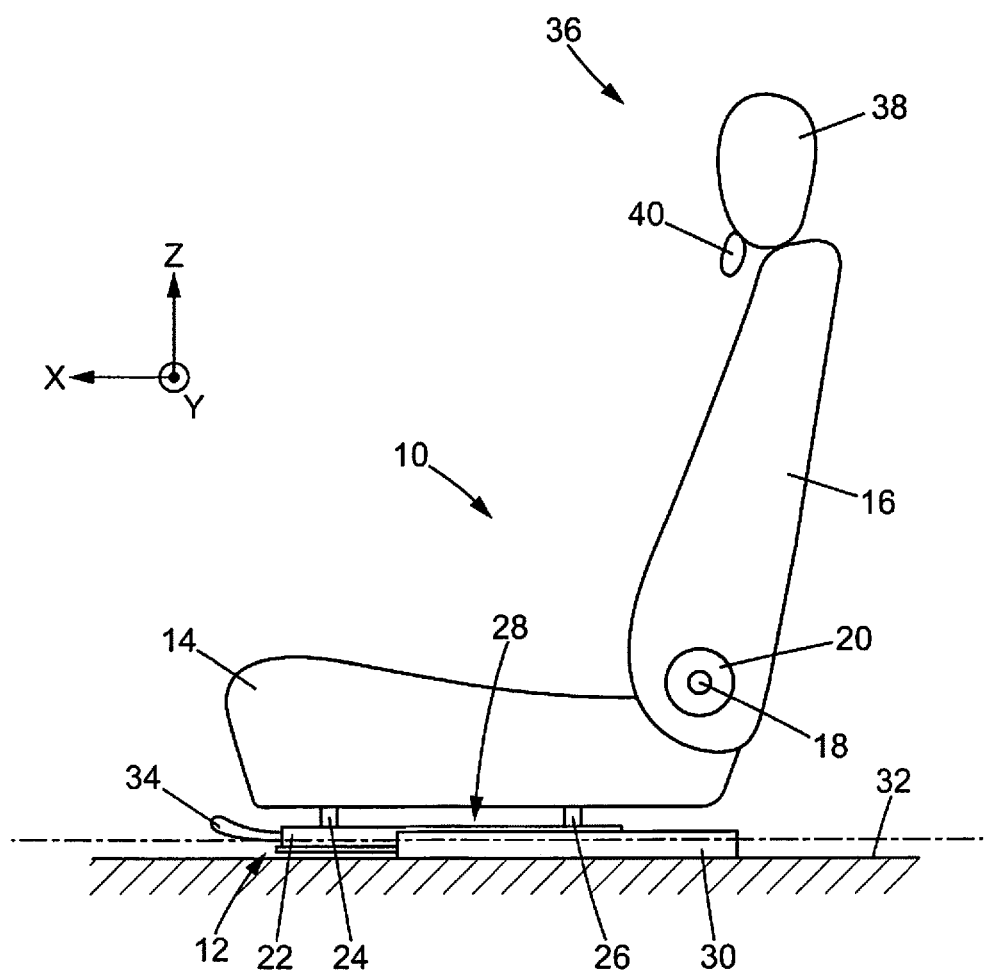

| | | | | |
|---|---|---|---|---|
| 7,213,883 B2* | 5/2007 | Charnitski | ............. | B60N 2/885 |
| | | | | 297/391 |
| 7,410,218 B2* | 8/2008 | Kotani | .................. | B60N 2/885 |
| | | | | 297/408 |
| 7,559,608 B2* | 7/2009 | Miyahara | ................ | B60N 2/20 |
| | | | | 297/408 |
| 8,596,716 B1* | 12/2013 | Caruso | .................... | G06F 3/041 |
| | | | | 297/217.3 |
| 9,340,131 B1* | 5/2016 | Kolich | .................. | B60N 2/914 |
| 9,713,974 B2* | 7/2017 | Mussi | .................... | B60N 2/914 |
| 10,829,019 B2* | 11/2020 | Dexter | .................. | B60N 2/809 |
| 2004/0195893 A1* | 10/2004 | Clough | .................... | A47C 7/38 |
| | | | | 297/391 |
| 2007/0257530 A1* | 11/2007 | Florez | ..................... | A47C 7/38 |
| | | | | 297/217.4 |
| 2008/0033518 A1* | 2/2008 | Rousso | .................... | A61F 7/10 |
| | | | | 607/112 |
| 2008/0167588 A1* | 7/2008 | Chen | ...................... | A61H 23/04 |
| | | | | 601/99 |
| 2016/0129815 A1* | 5/2016 | Kolich | .................. | B60N 2/865 |
| | | | | 297/391 |
| 2017/0113581 A1* | 4/2017 | Mussi | .................... | B60N 2/914 |
| 2018/0178696 A1* | 6/2018 | Dexter | .................. | B60N 2/809 |
| 2018/0281638 A1* | 10/2018 | Chu | ....................... | B60N 2/882 |
| 2020/0139851 A1* | 5/2020 | Oshima | .................. | B60N 2/18 |
| 2020/0139866 A1* | 5/2020 | Kanbara | ................ | B60N 2/882 |
| 2020/0215949 A1* | 7/2020 | Carles | .................... | B60N 2/976 |

FOREIGN PATENT DOCUMENTS

| | | |
|---|---|---|
| DE | 102012015390 A1 | 2/2014 |
| JP | 2007000257 A | 1/2007 |
| KR | 101515758 B1 | 4/2015 |

* cited by examiner

NECK SUPPORT MODULE FOR VEHICLE SEAT HEADREST

PRIORITY CLAIM

This application claims priority to French Application No. FR 19 00045, filed Jan. 3, 2019, which is expressly incorporated by reference herein.

BACKGROUND

The present disclosure relates to a neck support module for a vehicle seat headrest, in particular of a motor vehicle, to a headrest provided with such a neck support module, and to a vehicle seat, in particular of a motor vehicle, comprising such a headrest.

SUMMARY

According to the present disclosure, a neck support module provides even greater comfort to occupants of vehicle seats, particularly of a motor vehicle, more particularly of an autonomous motor vehicle.

In illustrative embodiments, a neck support module for a headrest device of a vehicle seat, in particular of a motor vehicle seat, comprises a frame and at least one inflatable pouch fixed to the frame.

In illustrative embodiments, the neck support module allows the occupant of a seat that is so equipped to also be supported at the neck. This minimizes the appearance of cramps or more generally of pain in the neck as the neck is supported between the back bolstered by the seat backrest and the head bolstered by the headrest.

In illustrative embodiments, the neck support module has one or more of the following features, alone or in combination:

the neck support module comprises: at least two inflatable pouches, preferably at least four inflatable pouches, more preferably at least six inflatable pouches; means for controlling the selective inflation of the inflatable pouches; and, preferably, an electronic control unit for sequentially controlling the inflation of the inflatable pouches in order to massage the neck of an occupant of the vehicle seat;

the neck support module comprises at least two inflatable pouches, the at least two inflatable pouches being arranged symmetrically on the frame;

the neck support module further comprises a pump for inflating the inflatable pouches;

the neck support module comprises: a flexible support; at least two first inflatable pouches interposed between the frame and the flexible support, the first inflatable pouches preferably being inflatable by means of the inflation pump, if there is such; and at least four, preferably at least six other inflatable pouches, opposite to the at least two first inflatable pouches relative to the flexible support, the other inflatable pouches being able to be inflated sequentially; and the inflatable pouches are shaped so as to rise as they expand when inflated.

In illustrative embodiments, a headrest device for a vehicle seat is described, in particular for a motor vehicle seat, comprising a headrest with a headrest frame and headrest upholstery, and a neck support module as described above in any of its combinations, the frame of the neck support module being fixed to the headrest frame, and the inflation pump, if there is such, being in the headrest.

In illustrative embodiments, the frame of the headrest module may be adapted to be moved relative to the headrest frame, in particular by rotation, between a functional position and a non-functional position.

In illustrative embodiments, a vehicle seat is described, in particular a motor vehicle seat, comprising a seating portion, a backrest, and a headrest device as described above in any of its combinations, the headrest being fixed to the backrest.

In illustrative embodiments, a method is described for making use of a neck support module as described above in any of its combinations or in a headrest device or in a vehicle seat, such as those described above in any of their combinations, so as to massage the neck of an occupant of the vehicle seat, the neck support comprising at least two inflatable pouches, the method comprising the sequential inflation of the at least two inflatable pouches Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

Figure 2:
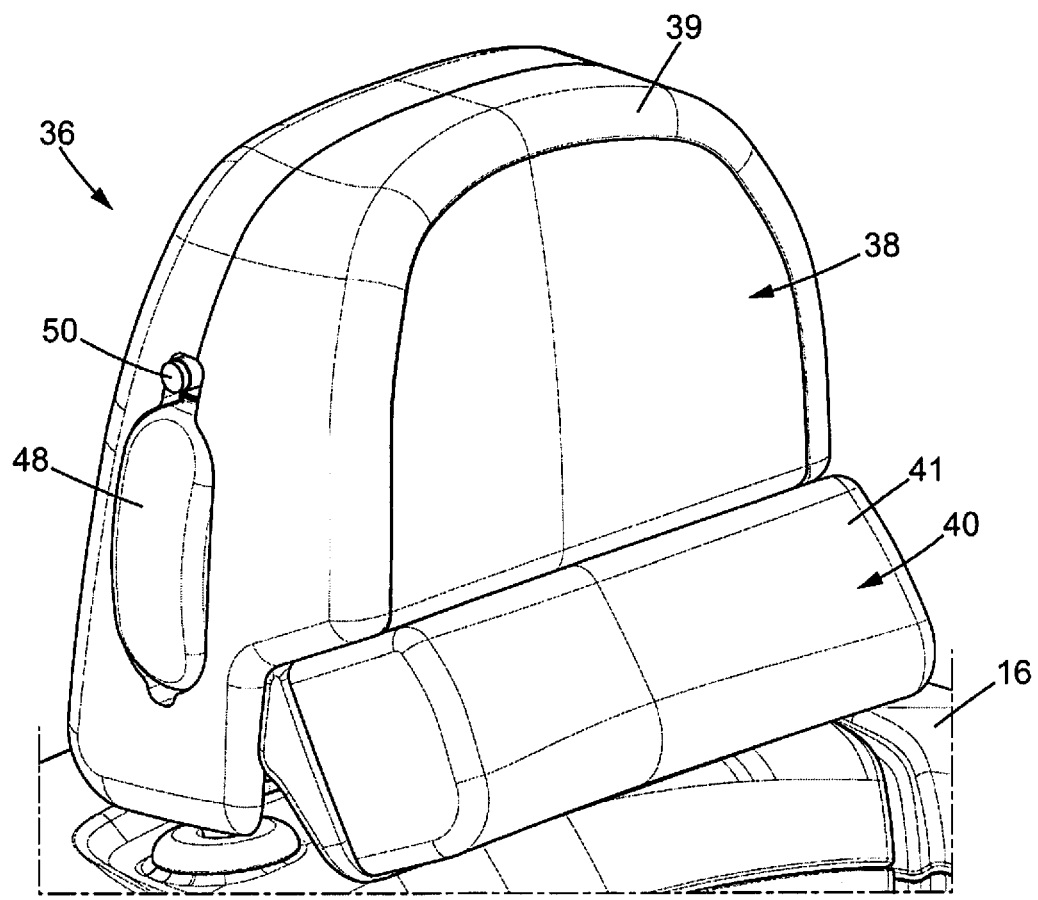
Figure 3:
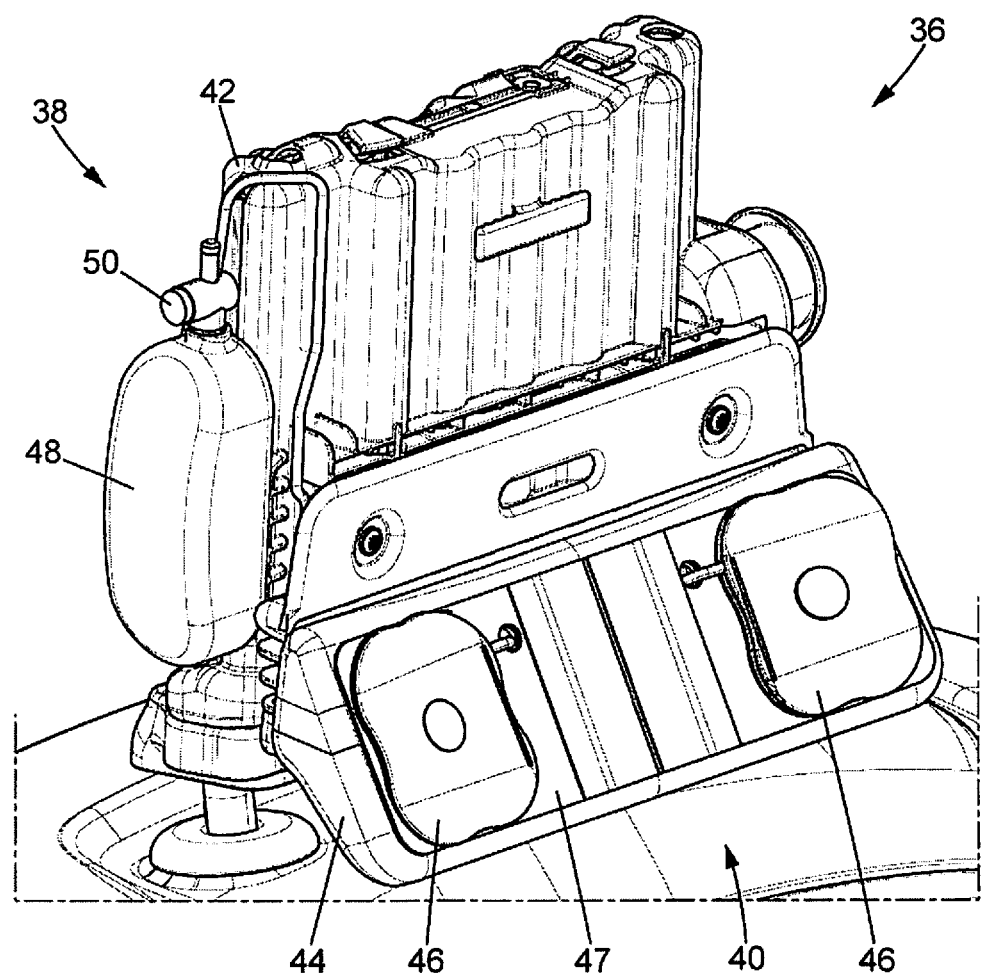
Figure 4:
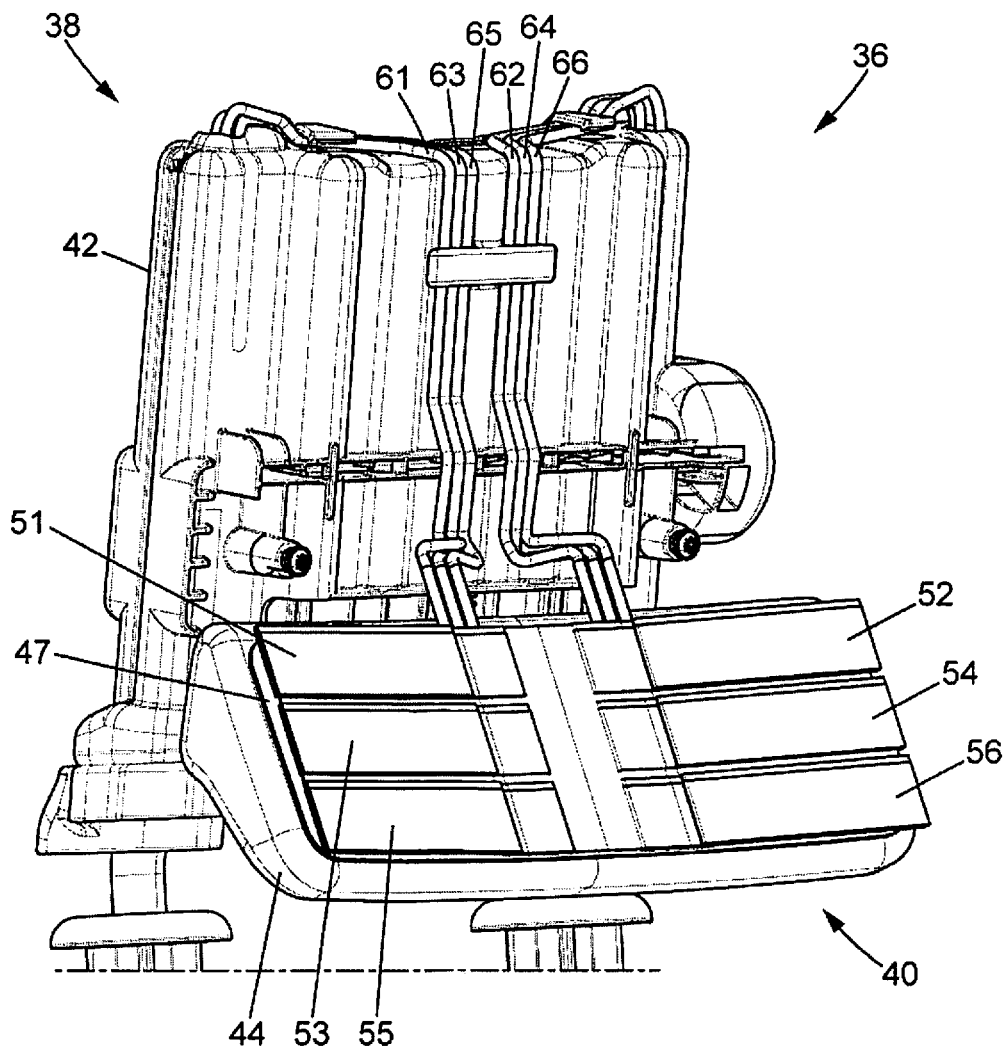
Figure 5:
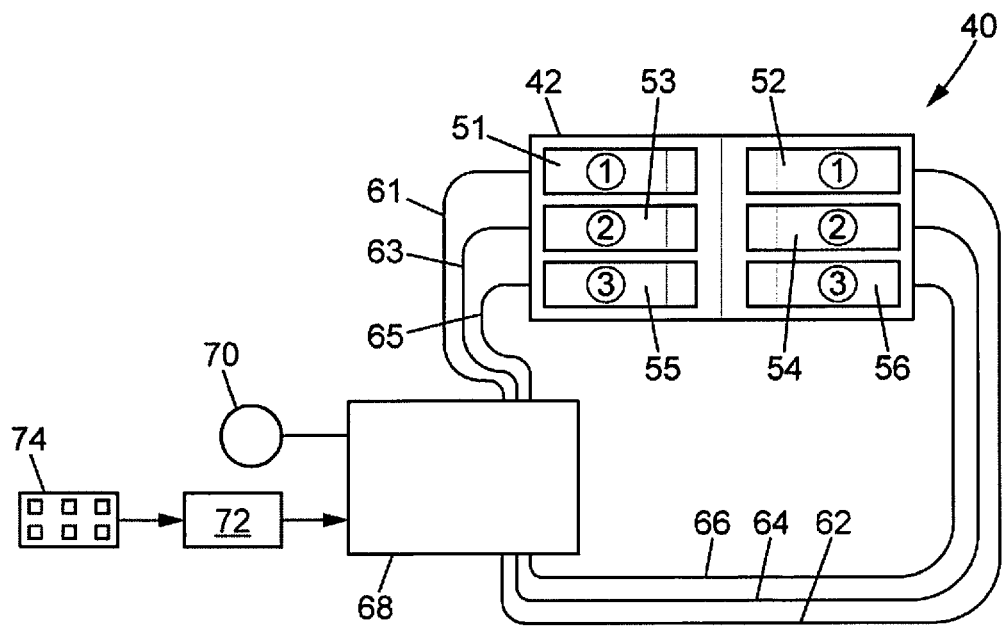
Figure 6A:
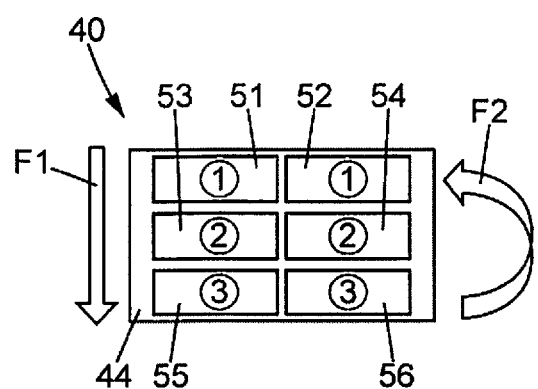
Figure 6B:
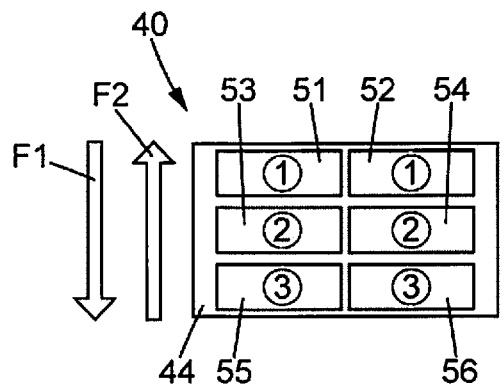
Figure 6C:
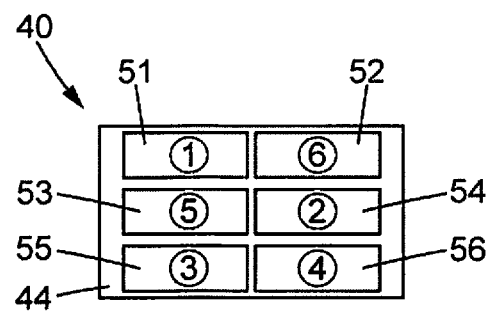
Figure 6D:
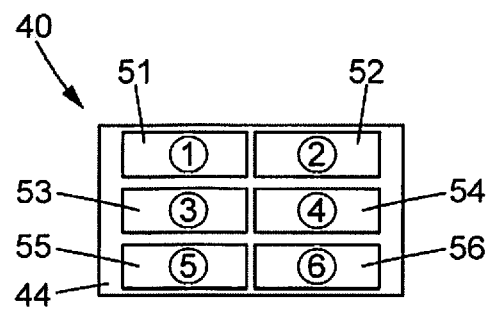
Figure 7:
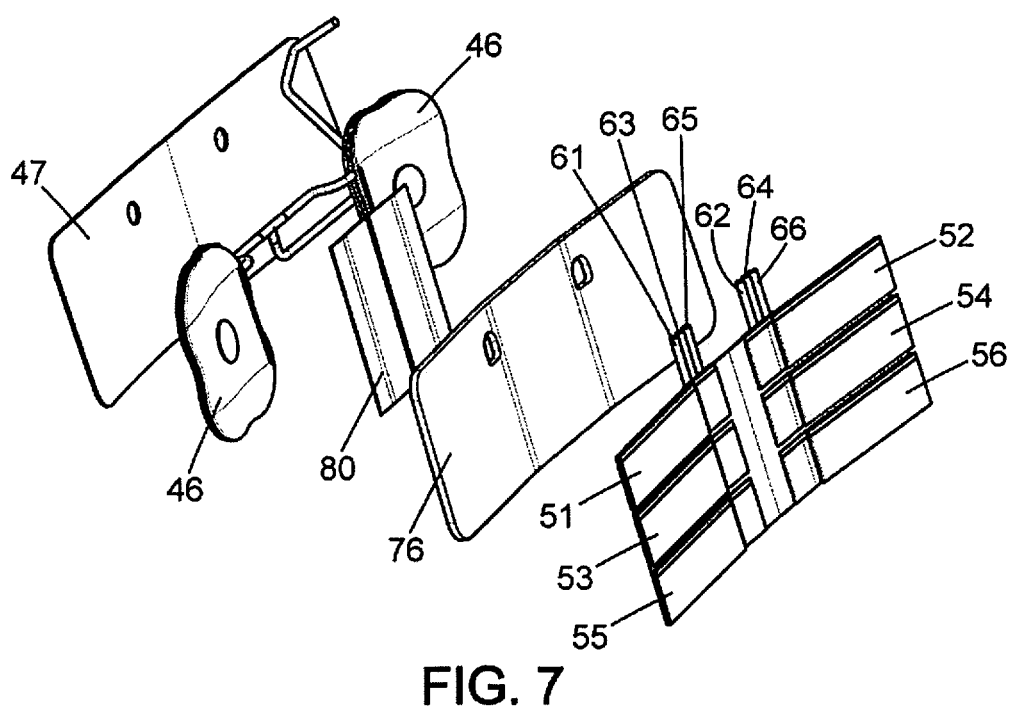

The detailed description particularly refers to the accompanying figures in which:

FIG. 1 schematically shows a motor vehicle seat from the side;

FIG. 2 schematically shows a perspective view of a first example of a headrest device that can be implemented on the vehicle seat of FIG. 1;

FIG. 3 schematically represents a perspective view of the first example of the headrest device of FIG. 2, the upholstery having been removed;

FIG. 4 represents a view similar to that of FIG. 3, of a second example of a headrest device that can be implemented on the vehicle seat of FIG. 1;

FIG. 5 schematically represents the neck support module of the second example of a headrest device;

FIG. 6a schematically illustrates a first example of a method for making use of the neck support module of FIG. 5;

FIG. 6b schematically illustrates a second example of a method for making use of the neck support module of FIG. 5;

FIG. 6c schematically illustrates a third example of a method for making use of the neck support module of FIG. 5;

FIG. 6d schematically illustrates a fourth example of a method for making use of the neck support module of FIG. 5; and FIG. 7 is an exploded view of the details of a neck support module of a third example of a headrest device that can be implemented on the vehicle seat of FIG. 1.

DETAILED DESCRIPTION

In the various figures, the same references designate identical or similar elements. For brevity, only the elements useful to understanding the described embodiments are shown in the figures and are described in detail below.

In the description which follows, when reference is made to absolute positional qualifiers such as the terms "front", "rear", "top", "bottom", "left", "right", etc., or relative positional qualifiers such as the terms "above", "below", "higher", "lower", etc., or orientational qualifiers such as "horizontal", "vertical", etc., unless otherwise specified these refer to the orientation of the figures or of a seat in its normal position of use.

FIG. 1 schematically represents a motor vehicle seat 10 mounted on a track mechanism 12.

The seat 10 comprises a seating portion 14 on which a backrest 16 is mounted, generally pivoting about an axis 18 via a hinge mechanism 20. The seating portion 14 is mounted on movable sections 22, also called sliders or male sections, by means of feet or crosspieces 24, 26. Each movable section 22 is part of a track 28 and is associated with a fixed section 30. The fixed section 30 is also called a rail or female section. The fixed section 30 is fixed to the floor 32 of a motor vehicle. In this example, the seat 10 comprises a manual control member 34, called a lever, to control the sliding of the tracks 28. This manual control member 34 permits relative movement between the movable sections 22 and the fixed sections 30 by action on a locking mechanism (not shown). More specifically, each movable section 22 can then slide relative to the fixed section 30 of the track 28 in the longitudinal direction X of the tracks 28. The fixed and movable sections 30 of the tracks 28 are generally of metal.

As illustrated, the seat 10 further comprises a headrest device 36 mounted so as to slide on the backrest 16, in order to be able to adjust the height in a substantially vertical direction. The headrest device 36 here comprises the headrest 38 itself, and a neck support module 40 fixed to the headrest 38.

FIG. 3 illustrates a first example of a headrest device 36, in which the upholstery 39 of the headrest 38 and the upholstery 41 of the neck support module 40 have been removed. Upholstery is, for example, foam or an equivalent, possibly covered with fabric, intended to maximize the comfort of a user of the headrest device 36.

As can be seen in FIG. 3, the headrest 38 comprises a headrest frame 42, intended in particular to ensure the mechanical strength of the headrest 38, to which is fixed the frame 44 of the neck support module 40 (hereinafter the neck support frame 44). The neck support frame 44 is mounted on the headrest frame 42 so as to be pivotable about an axis oriented in a substantially transverse direction of the seat 10, between at least one retracted position, ineffective or non-functional, where the neck support module 40 is arranged substantially in line with or even recessed relative to the headrest 38, and at least one effective or functional position, in which the neck support module 40 protrudes in front of the headrest 38 so that an occupant of the seat 10 can rest his or her neck against the neck support module 40. FIG. 3 illustrates such an effective position.

In the example of FIG. 3, the neck support module 40 comprises, in addition to the neck support frame 44 (or plate 44), two inflatable pouches 46 (or inflatable cushions or inflatable bladders) arranged symmetrically on the neck support frame 44. A support layer 47, for example of foam, may be interposed between the two inflatable pouches 46 and the neck support frame 44.

The two inflatable pouches 46 may be inflated with air by means of an inflation pump 48. The inflation pump 48 here is manual. Also noteworthy is that the inflation pump 48 is fixed to the headrest frame 42 and remains accessible to a user when the headrest upholstery 39 is present, as can be seen in FIG. 2. To achieve this, the headrest upholstery 39 does not cover the inflation pump 48. A valve 50 enables simultaneous deflation of the inflatable pouches 46. This valve 50 is also accessible to a user when the headrest upholstery 39 is in place, as the headrest upholstery 39 does not cover the valve 50. Thus, in this example, the inflatable pouches 46 are inflated and deflated together, to ensure that the upholstery 41 of the neck support module 40 is positioned as close as possible to the neck of the seat occupant. This improves the supporting of the neck by the neck support module 40, the neck of the occupant being received substantially in the middle of the neck support module 40. This also maximizes the comfort experienced by the occupant. To further improve comfort and optimize the volume of the inflatable pouches 46, the inflatable pouches 46 may be fixed to the neck support frame 44 so as to rise and expand at their end furthest from the center of the neck support frame 44. To achieve this, for example, the inflatable pouches 46 are fixed to the neck support frame 40 only near their end facing towards the middle of the neck support frame 44. Additionally or alternatively, the inflatable pouches 46 may be folded, in particular into a Z, and/or have surfaces partially welded together, so that the inflatable pouches 46 rise as they expand when inflated.

FIGS. 4 and 5 illustrate a second example of headrest device 36, provided with a second example of a neck support module 40.

According to this second example, six inflatable pouches 51-56 are arranged substantially symmetrically on the neck support frame 44. The six inflatable pouches 51-56 are thus divided into two groups, three inflatable pouches 51, 53, 55 being arranged one above the other on one side of the neck support frame 44, while the other three inflatable pouches 52, 54, 56 are arranged on the opposite side of the neck support frame 44. As in the first example, the inflatable pouches 51-56 are preferably fixed to the neck support frame 44 and/or are shaped so as to rise and expand at their end closest to a side of the neck support frame 44.

As can be seen, each inflatable pouch 51-56 is associated with an air line 61-66 connecting a respective inflatable pouch 51-56 to a valve block 68. The valve block 68 is operatively connected to a pump 70. The valve block 68 enables selective inflation of the inflatable pouches 51-56, preferably by means of a single pump 70. The pump 70 may be remote: external to the headrest 38 or even to the seat 10. Furthermore, the valve block 68 is connected to an electronic control unit 72, itself connected to a control box 74. It should be noted here that the control box 74 may be a unit specific to controlling the neck support module 40 or on the contrary may be an integral part of a larger control device. In particular, the control box 74 may be fixed to the seat 10, in particular to an armrest of the seat where applicable, in a door of the motor vehicle equipped with the seat, or to the dashboard of the vehicle. In the example, the electronic control unit 72 is distinct from the control box 74. In practice, the electronic control unit 72 may be part of the control box 74. The control box 74 allows controlling one or more programs corresponding to sequences of inflating and deflating the inflatable pouches 51-56 in order to obtain a massaging effect on the seat occupant. In other words, a sequential inflating of the inflatable pouches 51-56 is controlled in order to massage the neck of an occupant of the vehicle seat. The programs are stored, for example in the electronic control unit 72 which suitably controls the valve block 68 so that the pump 70 inflates the various inflatable pouches 51-56 and so that they deflate, in a sequential manner, in order to obtain the massaging effect.

FIGS. 6a-6d illustrate examples of programs that can be implemented in the neck support module 40 of FIG. 4. In these figures, the circled numbers indicate the order of inflation (and deflation) of the inflatable pouches 51-56 in a basic sequence to be repeated, the arrows F1, F2 indicating the order of the basic sequences in the program.

According to a first example of a massaging program, illustrated in FIG. 6a, the two highest inflatable pouches 51, 52 are inflated first, then the two central inflatable pouches 53, 54, and then the two lowest inflatable pouches 55, 56. The program continues by repeating the inflation of the two highest inflatable pouches 51, 52, and so on.

According to a second example of a massaging program, illustrated in FIG. 6b, the two highest inflatable pouches 51, 52 are inflated first, then the two central inflatable pouches 53, 54, and then the two lowest inflatable pouches. The program continues by repeating the inflation of the two central inflatable pouches 53, 54, then the highest inflatable pouches 51, 52, and so on.

According to the example of a massaging program illustrated in FIG. 6c, the first inflatable pouch 51 located at one corner of the neck support frame 44 is inflated first, then the fourth central inflatable pouch 54 located on the opposite side of the neck support frame 44, and finally the fifth inflatable pouch 55 located on the same side of the neck support frame 44 as the first inflatable pouch 51 but positioned lowermost. Thus, the path from one inflated pouch to the next forms a zigzag. Next, the sixth inflatable pouch 56 located opposite the fifth inflatable pouch is inflated and the sequence zigzags upwards, successively inflating the third inflatable pouch 53 and the second inflatable pouch 52. The program then loops by resuming the inflation of the first inflatable pouch 51.

According to a fourth example of a massaging program, the inflatable pouches 51-52, 53-54, 55-56 of one row are successively inflated, followed by the next row. When the last row is reached, the process restarts with the first row. Alternatively, once the last row of inflatable pouches 55-56 is reached, the path reverses by inflating the central inflatable pouches 53-54 then finally the highest inflatable pouches 51-52.

FIG. 7 illustrates an exploded view of a portion of a third example of a neck support module 40, this portion intended to be attached to the neck support frame 44. This third example combines the first and second examples in that they have two first inflatable pouches 46 intended to facilitate the positioning of the upholstery 41 of the neck support module 40 as close as possible to the neck of the occupant of the seat 10, and six other inflatable pouches 51-56 intended to massage the neck of the occupant of the seat 10.

In this case, a flexible layer 76 may be interposed between the first inflatable pouches 46 and the other inflatable pouches 51-56. This layer 76 may be a piece of fabric for example. In the illustrated example, this flexible layer 76 is fixed to the support layer 47 for the first inflatable pouches 46 only at the center of this flexible layer 76, for example by means of a layer of adhesive 80.

A vehicle seat comprises a seating portion, a backrest, and a headrest. The headrest may be height-adjustable. To further improve occupant comfort, some motor vehicle seats further comprise with a headrest that is movable in the longitudinal direction of the seat. In some examples, seats are heated and even provide massaging. In other examples, seats comprise a backrest having two parts arranged vertically one above the other, the uppermost part being movable relative to the lower part in order to support the upper back of the seat occupant.

The invention claimed is:

1. A headrest device for a vehicle seat comprising a headrest with a headrest frame and headrest upholstery, and a neck support module the neck support module comprising a frame, the frame of the neck support module being fixed to the headrest frame, a flexible support, at least two first inflatable pouches interposed between the frame and the flexible support, and at least four other inflatable pouches opposite to the at least two first inflatable pouches relative to the flexible support, the at least four other inflatable pouches being adapted to be inflated sequentially.

2. The headrest device of claim 1, wherein the frame of the headrest module is adapted to be moved relative to the headrest frame between a functional position and a non-functional position.

3. The headrest device of claim 2, wherein the frame of the headrest module is adapted to be moved relative to the headrest frame by rotation, between a functional position and a non-functional position.

4. A vehicle seat comprising a seating portion, a backrest, and the headrest device according to claim 1, the headrest being fixed to the backrest.

5. A method for making use of the neck support module of the headrest device according to claim 1, so as to massage the neck of an occupant of the vehicle seat, the method comprising the sequential inflation of the at least four other inflatable pouches.

6. The headrest device of claim 1, wherein the neck support module has a width that is substantially equal to a width of the headrest device and the neck support module is mounted to the headrest device for pivotable movement about an axis oriented in a substantially transverse direction of the seat between a retracted position, where the neck support module is arranged substantially in line with the headrest, and a functional position, in which the neck support module protrudes in front of the headrest so that an occupant of the seat can rest a neck of the occupant against the neck support module.

7. The headrest device of claim 6, wherein the entire neck support module is pivotable about the axis and the axis is located vertically between a lower end of the neck support module and an upper end of the headrest device.

8. The headrest device according to claim 1, further comprising a pump for inflating the at least two first inflatable pouches.

9. The headrest device of claim 8, wherein the pump is exposed to an exterior of the headrest.

10. The headrest device according to claim 1, further comprising an electronic control unit for sequentially controlling the inflation of the at least four other inflatable pouches to massage the neck of an occupant of the vehicle seat.

11. The headrest device according to claim 1, wherein the at least two first inflatable pouches are arranged symmetrically on the frame.

12. The headrest device of claim 1, wherein the at least four other inflatable pouches are arranged symmetrically on the flexible support.

13. A vehicle seat comprising
a seating portion,
a backrest mounted on the seating portion, and
a headrest device mounted on the backrest and configured to slide relative to the backrest,
wherein the headrest device includes a headrest portion and a neck support module coupled to the headrest portion for pivotable movement about an axis oriented in a substantially transverse direction to the vehicle seat between a retracted position, in which the neck of an occupant is spaced apart from the neck support module, and a functional position, in which the neck support module protrudes in front of the headrest portion and is configured to engage the neck of the occupant,
wherein the neck support module includes a neck support frame coupled to the headrest portion, a first inflatable pouch coupled to a first lateral side of the neck support frame, and a second inflatable pouch coupled to a second lateral side of the neck support frame, wherein the first and second inflatable pouches each have an inner end adjacent to a center of the neck support frame and an outer end spaced further from the center, and the first and second inflatable pouches are configured to rise and expand at the outer end of the first and second inflatable pouches such that the first and second inflatable pouches move about a vertical axis located at the inner end of the first inflatable pouch and the second inflatable pouch, and wherein each vertical axis is fixed in position relative to the axis.

14. The vehicle seat of claim 13, further comprising at least two inflatable pouches on each lateral side of the neck support frame and means for controlling the selective inflation of the inflatable pouches.

15. The vehicle seat of claim 14, wherein the means for controlling is an electronic control unit for sequentially controlling the inflation of the inflatable pouches in order to massage the neck of an occupant of the vehicle seat.

16. The vehicle seat of claim 14, wherein the at least two inflatable pouches are arranged symmetrically on each lateral side of the neck support frame.

17. The vehicle seat of claim 13, further comprising a manual pump coupled to the headrest device for upward and downward movement with the headrest device relative to the backrest.

18. The vehicle seat of claim 13, further comprising a flexible support, at least two first inflatable pouches interposed between the neck support frame and the flexible support, and at least four other inflatable pouches, opposite to the at least two first inflatable pouches relative to the flexible support, the other inflatable pouches being adapted to be inflated sequentially.

19. The vehicle seat of claim 18, further comprising an inflation pump for inflating the at least one inflatable pouch.

* * * * *